United States Patent

[11] 3,575,224

[72] Inventor Alvin W. Hughes
    Bensenville, Ill.
[21] Appl. No. 759,432
[22] Filed Sept. 12, 1968
[45] Patented Apr. 20, 1971
[73] Assignee A. W. Hughes Company, Inc.
    Addison, Ill.

[54] EMULSIFYING AND DEAERATING APPARATUS FOR SAUSAGE BATTER AND THE LIKE
    9 Claims, 6 Drawing Figs.
[52] U.S. Cl. .................................................. 146/192,
    233/13, 241/186, 259/44, 99/272
[51] Int. Cl. .............................................. B02c 18/00
[50] Field of Search ........................................ 233/(Inquired),
    13; 259/7, 8, 43, 44, 164; 146/192;
    99/272, 273; 241/186

[56] References Cited
    UNITED STATES PATENTS
| | | | |
|---|---|---|---|
| 2,003,621 | 6/1935 | Andersson | 233/13 |
| 3,334,674 | 8/1967 | Hughes | 146/192 |
| 3,464,343 | 9/1969 | Nedekind et al. | 99/272 |
| 3,189,286 | 6/1965 | O'Connor | 241/186 |

FOREIGN PATENTS
869,184  10/1941  France ........................ 259/164

Primary Examiner—Willie G. Abercrombie
Attorney—Wolfe, Hubbard, Leydig, Voit and Osann ABSTRACT: Apparatus for deaerating sausage batter and the like either alone or in combination with emulsifying treatment of the product where means is provided for centrifugally separating and removing unwanted foreign objects from the sausage batter incident to the deaeration thereof. An emulsifier assembly for deaerating apparatus having a rotatable sleeve including radially inwardly extending impeller vanes for rapidly imparting rotation to the batter and feeding it through the emulsifier. A rotating attenuator receives the batter ejected from the emulsifier and centrifugally thins out the batter for contact with the vacuum atmosphere.

Deaerating apparatus having a piston-type discharge pump at the lower end of the machine which alternately reciprocates with a sliding valve arrangement so that material is pumped out of the vacuum chamber in a positive, continuous manner. A feedhopper arrangement having a discharge outlet at its lower end with means for elevating the hopper to the feed position, connecting the discharge outlet to the machine inlet and control means for starting and stopping the drive motor for the emulsifier associated with the feeding of the material from the hopper.

INVENTOR
ALVIN W. HUGHES
BY
Wolfe, Hubbard, Voit & Osann
ATTORNEYS

EMULSIFYING AND DEAERATING APPARATUS FOR SAUSAGE BATTER AND THE LIKE

The present invention relates generally to deaerating apparatus and, more particularly, to an improved deaerating apparatus for sausage batter and the like. In its principal aspect, the invention is concerned with improved apparatus for deaerating sausage batter and the like either alone or in combination with emulsifying treatment of the batter, yet wherein unwanted materials present in the batter are separated and removed incident to such treatment of the product.

For a number of years there has been a persistent and increasing demand for improving the preparation of sausage batter emulsions throughout the various steps from chopping operations to stuffing the finished product into casings or other packages. The advent of deaerating and emulsifying equipment as described and claimed, for example, in U.S. Pat. No. 3,334,674, issued Aug. 8, 1967 to Alvin W. Hughes enables sausage manufacturers to produce a product which is very stable, substantially free from entrained air pockets and higher density than previously accomplished. As a consequence, there arose a need for still further improved handling of the sausage material with such deaerating and/or emulsifying machines to derive maximum benefits and advantages of the equipment. In addition, the presence of foreign objects, ferrous or nonferrous, such as tag wires, box staples, bone fragments and the like in processed meat products is an ever present problem to the meat industry. Magnetic separators have been utilized in conjunction with meat processing equipment, however, they are not useful for removing nonferrous objects which often find their way into the processed meat products. Thus, prior devices have not provided a completely satisfactory solution to the problems faced by manufacturers of processed meat products such as sausage and the like.

Accordingly, it is the general aim of the present invention to provide improved apparatus for deaerating sausage batter and the like characterized by its ability to produce more satisfactory finished product with even greater density than heretofore possible and yet without sacrifice to the economy of operating the equipment.

It is a related object of the invention to provide improved deaerating apparatus either alone or in combination with an emulsifier wherein a large quantity of sausage batter can be introduced into the machine in a substantially continuous manner and where positive removal of the finished product is accomplished without interruption of the flow of the material into the machine. In this connection there is an object to provide a simple deaerating apparatus which is particularly suitable for use in mass production manufacturing operations.

It is a further object of the invention to provide improved deaerating apparatus for sausage batter and the like which permits ease and rapidity of loading of the material into the machine as well as rapidity of removal of the finished product from the machine.

In another of its important aspects it is an object of the invention to provide improved deaerating apparatus for sausage batter and the like either alone or in combination with an emulsifier wherein foreign objects present in the product, whether ferrous or nonferrous are centrifugally separated and removed from product flowing through the machine.

It is a more specific object of the invention to provide improved deaerating and emulsifying apparatus for sausage batter and the like wherein the batter is moved through the emulsifier in a more rapid manner without increasing the heat input or power requirement of the emulsifier and with a consequential production of a more dense and more stable finished product.

Other objects and advantages of the invention will be apparent as the following description proceeds, taken in conjunction with the accompanying drawings, in which:

FIG. 5 is a sectional view of the attenuator illustrated in FIG. 1, and;

FIG. 6 is a top view of the attenuator of FIG. 5.

Figure 1:
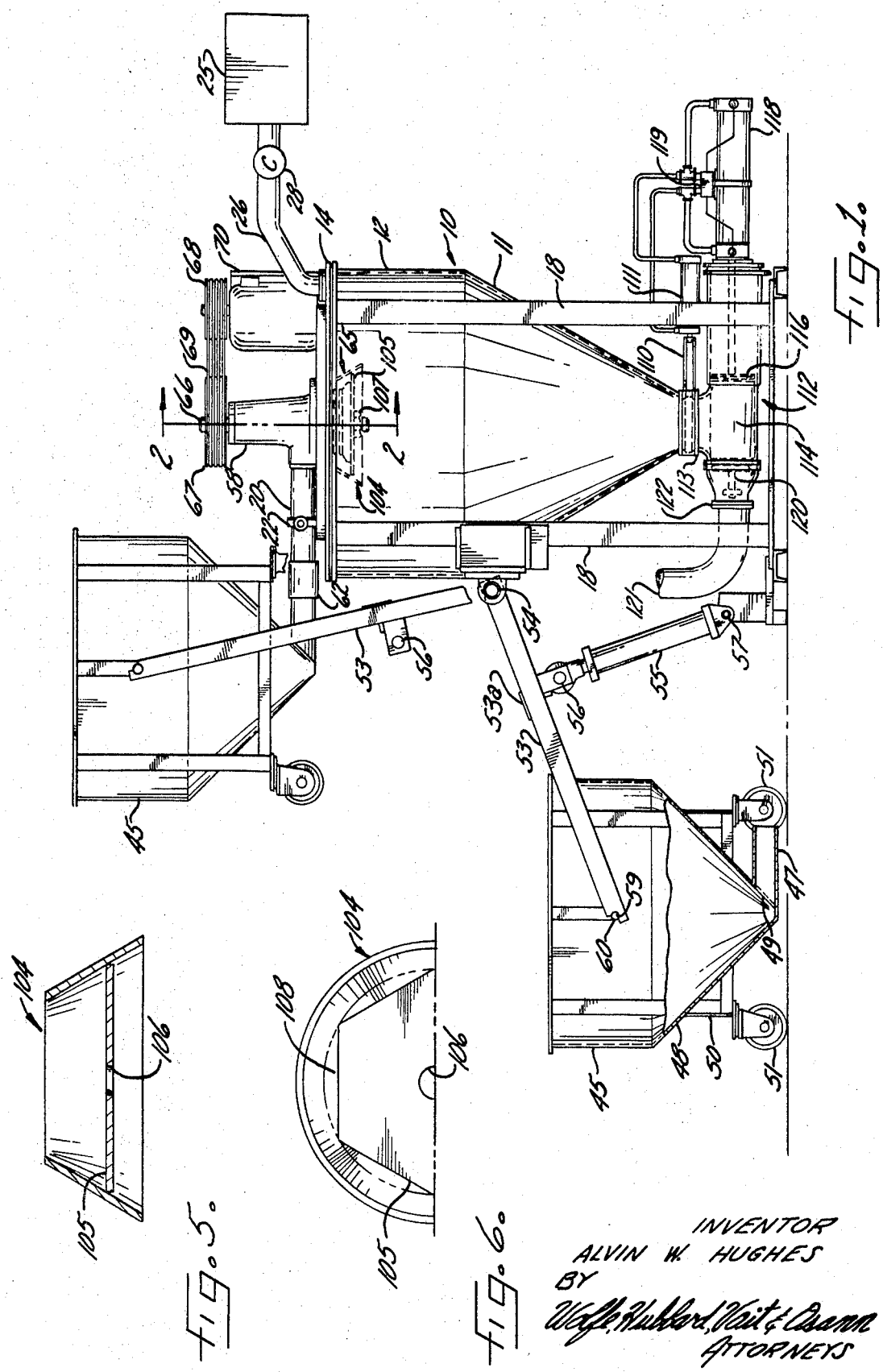
FIG. 1 is an elevational view of an exemplary embodiment of an emulsifying and deaerating apparatus incorporating the features of the present invention and with portions shown broken away to reveal the internal construction. This view also shows the orientation of the feedhopper in an elevated position ready for feed of material into the machine.

While the invention is susceptible of various modifications and alternative forms, specific embodiments thereof have been shown by way of example in the drawings and will herein be described in detail. It could be understood, however, that it is not intended to limit the invention to the particular forms disclosed, but, on the contrary, the invention is to cover all modifications, equivalents and alternatives falling within the spirit and scope of the invention as expressed in the appended claims.

Referring now to the drawings, and particularly to FIG. 1, there is illustrated an exemplary deaerating apparatus, generally indicated at 10, particularly suited for deaerating and emulsifying sausage batter. In accordance with the present invention, as best shown in FIG. 1, the exemplary deaerating apparatus 10 includes a body 11 in the shape of an inverted cone joined to a cylindrical section 12. A cover 14 encloses the chamber thus formed. A suitable gasket or O-ring may be provided to effect a seal between the body and cover.

The body is supported in the present instance on a set of vertical legs 18 made of angle iron or the like and which may be four in number, equally spaced about the periphery.

For the purpose of admitting batter from a source, a batter inlet conduit 20 is provided which has interposed therein a fluid-operated solenoid-controlled inlet valve 22 that includes a vacuum-controlled switch. In order to evacuate the chamber and provide the required degree of vacuum, a source of vacuum 25 is provided connected to the chamber through a fitting 26 having interposed therein an inlet valve 28. It should be understood that the term, "source of vacuum" is simply used for the sake of convenience and such source may, for example, be a vacuum pump capable within a short space of time of drawing a vacuum within the chamber of the order of 26 inches of mercury.

In carrying out the present invention, provision is made for loading the deaerating apparatus 10 utilizing a portable feedhopper 45 having a discharge conduit 47 adjacent the bottom of the hopper, the latter being automatically elevated to a feed position above the deaerating apparatus 10. Thus, as shown in FIG. 1, the feedhopper 45 is defined by an inverted cone-shaped receptacle 48 having an opening 49 at its lower end connected to the generally horizontally extending discharge conduit 47. The receptacle 48 is carried by a frame 50 mounted upon wheels 51.

For the purpose of elevating the hopper 45 to the feed position there is provided a pair of arms 53 (only one being shown) having ends 54 pivotally mounted to adjacent legs 18 of apparatus 10. Actuator 55 is provided attached to a cross bar 53a at pivot point 56 and suitably anchored to apparatus 10 at pivot point 57. In order to attach the hopper 45 to the arms 53 to elevate the hopper, there is provided suitable recesses 59 adjacent the free ends of arms 53 which receive pins or lugs 60 (only one being shown) disposed on opposite sides of the hopper and protruding radially outward therefrom.

For the purpose of effecting a proper connection between discharge conduit 47 of the hopper and inlet conduit 20 on the deaerating apparatus 10, there is provided an axially shiftable sleeve 62 which is preferably in the form of a piece of Tygon tubing or the like. The sleeve 62 which is preferably carried by the inlet conduit 20, is simply shifted to bridge conduits 47 and 20 when they are brought into alignment.

Mounted at the top of the deaerating apparatus 10 is an emulsifier assembly, generally indicated at 65, driven through shaft 66 by means of pulleys 67, 68 and beltings 69 rotated by motor 70. Motor 70, may for example, be a 50 hp. high-torque motor operating at about 1,800 r.p.m.

Figure 2:
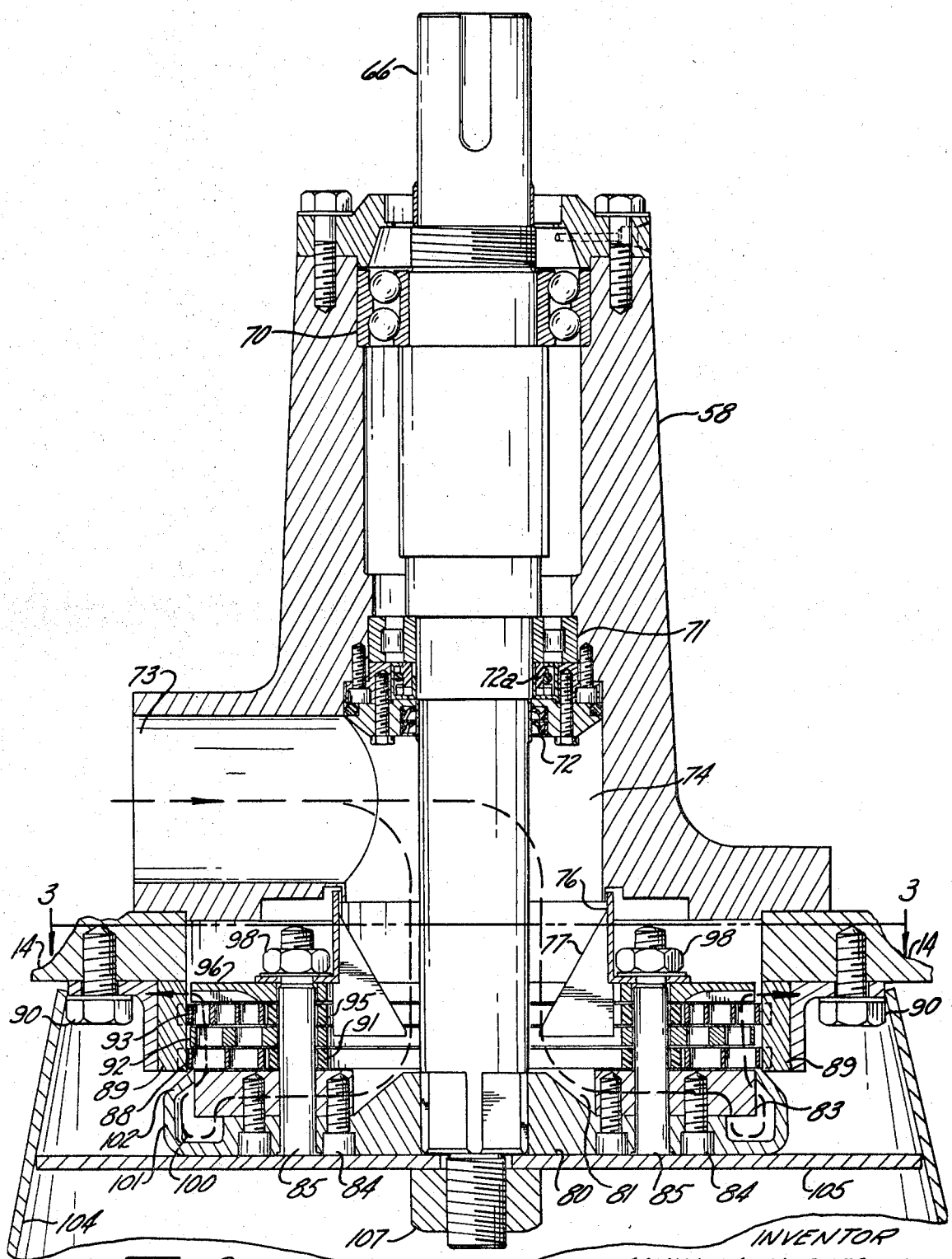
FIG. 2 is a section taken along the line 2—2 in FIG. 1 and illustrating the path of flow of the material through the emulsifier.

As best shown in FIG. 2, the emulsifying assembly 65 includes alternate rotatable and nonrotatable perforate rings horizontally disposed about shaft 66 within the deaerating apparatus chamber, with the shaft 66 projecting upwardly beyond the cover 14. The shaft 66 is surrounded by a casing 58 having suitable bearings 70, 71 and seals 72 interposed between the shaft 66 and casing 68.

Figure 3:
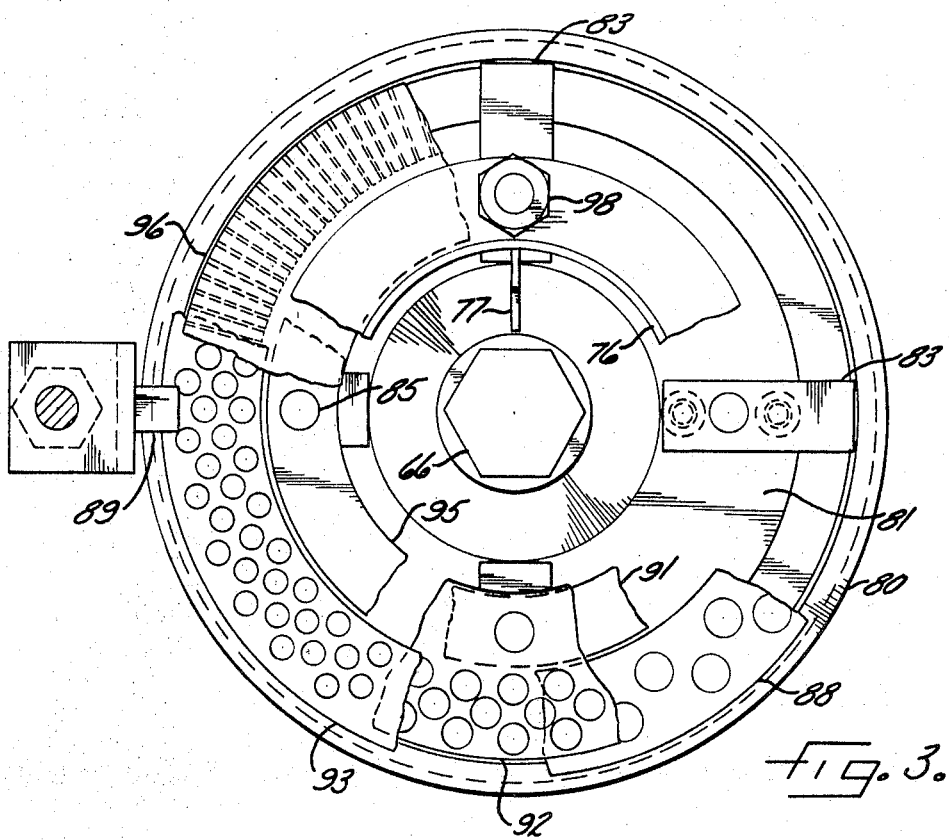
FIG. 3 is a sectional view taken along the line 3—3 in FIG. 2 with various parts broken away at different levels.

In order to direct incoming batter towards the center of the emulsifying assembly 65, the casing 58 is provided with an inlet opening 73 which receives inlet conduit 20 to communicate with an axial space 74 about shaft 66 and below seals 72, 72a which prevent loss of batter upwardly through bearings 70, 71. In carrying out the present invention, provision is made for rapidly imparting rotational motion to incoming batter thereby facilitating and increasing the through feed of the batter in the emulsifier. To this end, rotatable sleeve 76 having a plurality of radially inwardly extending vanes 77 disposed about the shaft 66 and in the path of incoming batter from entry space 74 sets the batter into rotation and urges the batter downwardly and outwardly of the center of the assembly. Referring to FIG. 2 and 3, conjointly, the emulsifying assembly 65 is provided with a drive ring 80 secured adjacent to the lower end of shaft 66 with the drive ring 80 having an annular depression 81 formed on the upper surface thereof. Cutter bars 83, there being four in number, are seated in the recess 81 of drive ring 80 and secured thereto by machine screws 84 and thus dividing the drive ring into quadrants. Upstanding guide pins 85 pass through the drive rings 80 and cutter bars 83.

The emulsifier arrangement 65 is similar in general function and mode operation to the emulsifier disclosed and claimed in U.S. Pat. No. 3,334,674 issued to Alvin W. Hughes and entitled "Combination Emulsifying and Deaerating Machine for Sausage Batter and the Like." However, the rotatable sleeve 76 and drive ring 80 previously discussed in connection with the present invention are not found in the aforementioned U.S. Pat. No. 3,334,674 structure.

As shown in FIGS. 2 and 3, a nonrotatable primary sizing ring 88 is disposed directly above the drive ring 80 and is provided with radial slots that engage projections or ears 89 suitably attached to the cover 14 as by bolts 90. A ring spacer 91 which is slightly thicker than sizing ring 88 is secured to guide pins 85 to maintain accurate spacing between the cutter bars 83 and next rotatable perforate transfer ring 92 which is disposed above the nonrotatable primary sizing ring 88. A ring spacer 95 which is slightly thicker than sizing ring 93 is secured to guide pins 85 to maintain accurate spacing between the rotatable transfer ring and a rotatable radially slotted discharge ring 96 which is secured to the guide pins 85 with the whole assembly held in place by nuts 98 attached to the threaded ends of the guide pins 85.

In carrying out another of the important aspects of the present invention, there is provided, centrifugal trapping means associated with drive ring 80 of the present emulsifier 65 so that unwanted foreign objects whether ferrous or nonferrous, which may be present in the batter are separated and removed incident to the combined action of the emulsifier and subjection to the vacuum atmosphere for deaeration of the batter. To this end, drive ring 80 includes an annular recess or pocket 100 adjacent its periphery and defined by the end wall having an upstanding portion 101 and inwardly sloping portion 102. The arrangement is such that the end wall of drive ring 80 defining the pocket 100 is of a greater diameter than the primary sizing ring and foreign objects such as tag wire, staples, pieces of bone and the like having a greater density than that of the batter are removed and centrifugally held against the inside of the end wall of pocket 100. The thus separated debris may be removed by scraping the outer wall of pocket 100 when the emulsifier assembly 65 is disassembled for cleaning, usually done at the end of a day's use in the sausage making industry.

It may be readily appreciated that when in operation, sausage material is fed upwardly by drive ring 80 through the primary sizing ring 88 transfer ring 92, secondary sizing ring 93, and finally through discharge ring 96 which centrifugally hurls the material outwardly against the inner wall of a rotating attenuator 104 (FIGS. 1, 5 and 6). The attenuator 104 is made up of a generally frustoconical-shaped sleeve with a horizontally disposed polygonal-shaped plate 105 attached to the inner wall of the sleeve intermediate the ends thereof. The plate 105 is provided with a central opening 106 which receives drive shaft 66 of the emulsifier and is secured to the latter for rotation therewith by a nut 107. Elongated openings 108 between the sleeve and plate 105 permit batter to flow downwardly along the inside wall of the sleeve and subsequently the batter is ejected centrifugally outward from the lower peripheral edge of the attenuator 104. Thus, batter flowing outward from the peripheral edge of the attenuator is thinned down sufficiently so that contact with the vacuum atmosphere on both sides enables substantially complete removal of any air which is entrained within the batter. I have found that with the use of the attenuator 104 to redirect the flow of batter emerging from the cutting rings, the density of the final product is increased beyond that obtainable without the use of the attenuator. After the deaerated batter gravitates downwardly, it builds up at the bottom of the deaerating apparatus body 11.

In carrying out another important aspect of the present invention, provision is made for continuously removing the deaerated batter without disrupting the inflow of product through the apparatus or removing the applied vacuum. To this end, referring to FIG. 1, there is provided a fluid operated sliding valve 110 operated by fluid cylinder 111 which reciprocatingly opens and closes the opening at the bottom of the deaerating apparatus body portion 11.

Disposed beneath the sliding valve 110 is a piston-type discharge pump 112 having its inlet 113 coupled to a suitable fitting provided at the opening in the bottom of body portion 11 such that with the sliding valve 110 open, batter may fall into the cavity 114 of discharge pump 112. In order to positively remove batter from the pump cavity 114, there is provided a double-acting reciprocating piston 116 which is operated by a fluid cylinder 118 actuated by a four-way pilot bleed valve 119 coupled to a suitable source of pressurized fluid (not shown) in a conventional manner well known to those skilled in the art. Thus, when the right-hand end of cylinder 118 as viewed in FIG. 1 is coupled to the source of pressurized fluid, the piston 116 is shifted axially to the left. Conversely when the left-hand end of the cylinder 118 is coupled to the source of pressurized fluid and the right-hand end is coupled to a suitable bleed line, the piston 116 is shifted axially towards the right as viewed in FIG. 1. The sliding valve fluid cylinder 111 is suitably coupled to the four-way pilot valve 119 so that the valve 110 closes, then piston 116 is moved to the left, valve 110 opens and then piston 116 moves to the right as viewed in FIG. 1. At the discharge end of the pump 112 there is provided a self-actuating discharge valve 120 which seals the pump outlet opening when the piston 116 is retracted to that there is no loss of vacuum in the deaeration apparatus. An outlet conduit 121 connected to the pump 112 outlet by a quick clamp connector 122 is provided which may be connected to any suitable source of batter utilization such for example as a stuffing machine or the like.

In order to more fully understand the mode of operation of the exemplary deaerating apparatus, reference is now made to FIG. 1 wherein the apparatus is shown in the start position in readiness for operation. Prior to initiation of the deaerating operation, it will be assumed that the elevating arms 53 are in position to receive a loaded hopper 45 and the deaerating and emulsifying apparatus systems are in readiness for operation. The hopper is elevated by cylinder 55 through arms 53 until discharge conduit 47 of the hopper is aligned with the inlet conduit 20 of the deaerating machine. The sleeve 62 is slid to the left as viewed in FIG. 1 bridging the respective conduits 47, 20. At this point the valve 28 for source of vacuum 25 is opened to pull the desired vacuum in the chamber. Valve 22 in the inlet conduit 20 includes a vacuum-controlled switch connected to the power source into motor 70 so that the motor cannot start until a predetermined vacuum is reached in the chamber. In addition, the vacuum-controlled switch functions to shut off the motor 70 if the predetermined vacuum is broken. When the proper degree of vacuum is reached, valve 22 is opened and motor 70 starts the emulsifier 65, and batter entering through inlet conduit 20 goes through the emulsifier assembly, as previously described. Upon leaving the emulsifier the batter is slung against the inner wall of attenuator 104 where it flows downwardly and is then centrifugally thrown outwardly by the attenuator. The batter then falls down to the bottom of the chamber 11 where it collects. Once the batter has begun to collect at the bottom of chamber 11, the reciprocating valve 110 and discharge pump 16 are operated as previously described to eject the now deaerated batter out through outlet conduit 121.

Figure 4:
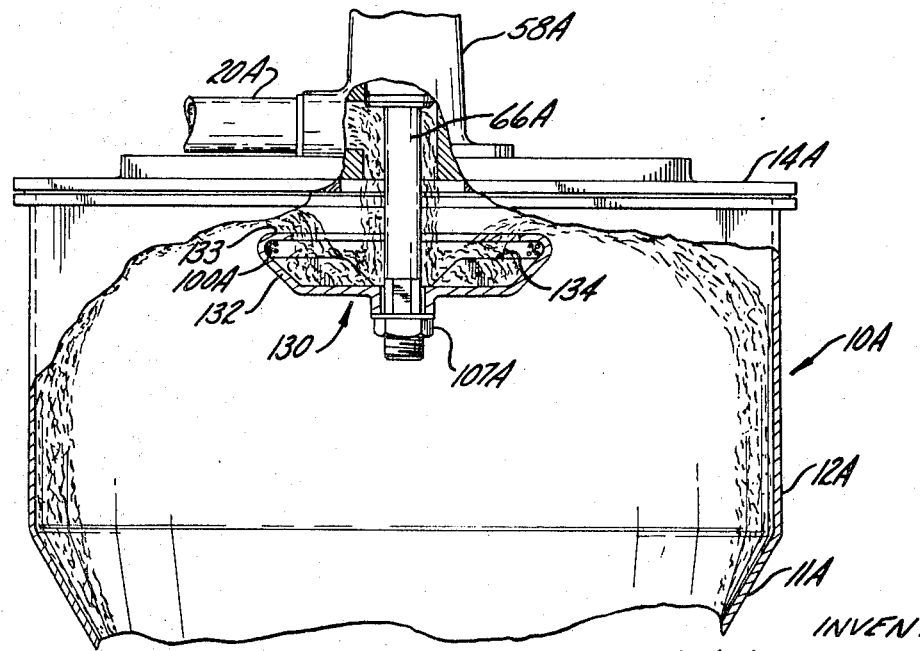
FIG. 4 is an elevational view of an exemplary modified deaerating apparatus also embodying the features of the present invention, here depicting an alternative embodiment of the centrifugal separating trap arrangement.

Referring now to FIG. 4, a modified form of deaerating apparatus generally indicated at 10A has been depicted. In this instance the apparatus 10A, while including a body 11A in the shape of an inverted cone joined to a cylindrical section 12A, a cover 14A enclosing the chamber thus formed and inlet casing 58A with inlet conduit 20A which surrounds the drive shaft 66A, all similar to that shown in FIG. 1, does not include the emulsifying apparatus. Thus, as seen in FIG. 4, attached to the end of shaft 66A is a centrifugal separating trap member 130 defined by a generally dish-shaped wall 132 with its upper peripheral edge 133 extending radially inward toward shaft 66A forming a recess of pocket 100A. A plurality of vertically extending vanes 134 attached on the inside of trap 130 about shaft 66A serve to rapidly impart rotational motion to the batter flowing onto the trap member 130. The batter entering from conduit 20A falls onto the trap member, builds up in the trap member 130, moves centrifugally outward and flows over the inwardly extending peripheral edge 133 thinned out for exposure to the vacuum atmosphere. Any debris which might be present in the batter such as tag wires, staples, bone fragments and the like are caused to move into pocket 100A where they remain until scraped out during cleaning.

I claim:

1. In an apparatus for deaerating sausage batter or the like, the combination comprising: an enclosed chamber having upper and lower end portions, means including an inlet conduit extending into said chamber upper end portion, a rotatable drive shaft projecting into said chamber upper end portion, means for pulling a vacuum in said chamber, a centrifugal trap member disposed about said shaft for rotation therewith and adapted to receive batter flowing into said chamber from the inlet conduit, said trap member including an end wall terminating in an inwardly sloping end portion defining a pocket at the outer periphery so that unwanted materials present in the batter are centrifugally separated and retained in said pocket while the batter flows out of said trap member whereby entrained air is removed by the vacuum in said chamber.

2. Apparatus as defined in claim 1, wherein said trap member includes a plurality of vertically extending vanes for rapidly imparting rotational motion to batter flowing onto the trap member.

3. Apparatus as defined in claim 1, including a plurality of spaced alternating rotatable and nonrotatable rings disposed about said shaft above said trap member, said rotatable and nonrotatable rings having perforations therein for cutting batter fed therethrough into finer pieces and the uppermost one of said rotatable rings having means for centrifugally discharging the batter therefrom.

4. Apparatus as claimed in claim 3, including an attenuator rotatable with said shaft, said attenuator comprising a frustoconical-shaped sleeve member disposed about said rotatable and nonrotatable rings, a polygonal-shaped plate member attached to said sleeve member intermediate its ends, said plate member being connected to said shaft and means defining a plurality of openings between said plate member and said sleeve member whereby batter flowing from said discharge ring contacts said sleeve member, flows downwardly and moves outwardly from the periphery of said sleeve for acting upon by the vacuum in said chamber.

5. Apparatus as claimed in claim 1 including means defining a discharge opening at the bottom of said chamber, said discharge opening means being connected to alternately reciprocating valve means and piston discharge pump means and fluid-operated control means for operating said valve and said pump to remove collected batter from said chamber.

6. Apparatus as claimed in claim 1 including a hopper for carrying batter to be fed to said apparatus, said hopper having a discharge conduit at its lower end, means associated with said apparatus for elevating said hopper above the chamber and means for connecting said hopper discharge conduit to said chamber inlet conduit when the hopper is in the elevated feed position.

7. An apparatus for emulsifying and deaerating sausage batter or the like, comprising in combination, an enclosed vacuum chamber having upper and lower portions, inlet conduit means extending into said upper end portion of the chamber, means for pulling vacuum in said chamber, and emulsifier at the upper end of said chamber comprising a rotatably driven shaft means projecting into said projecting upper end, a plurality of spaced alternating rotatable and nonrotatable perforated rings disposed about said shaft and radially spaced therefrom, rotatable feed means disposed between said shaft and said rotatable and nonrotatable rings for imparting rotation to batter entering from said inlet conduit and moving said batter radially outward, a drive ring connected to said shaft beneath the lowermost one of said rotatable and nonrotatable rings, said drive rings having means for feeding the batter axially through the perforations in said rotatable and nonrotatable rings whereby said batter is cut into fine pieces, means associated with the uppermost one of said rotatable rings for centrifugally discharging the batter therefrom, and a rotatable attenuator disposed about said emulsifier assembly for receiving the batter flowing from said discharge ring whereby said batter flows downwardly and moves outwardly from the periphery of said attenuator for acting upon by the vacuum in said chamber.

8. Apparatus as defined in claim 7 wherein said rotatable feed means includes a sleeve having a plurality of radially inwardly extending vanes disposed about said shaft and in the path of incoming batter.

9. Apparatus as claimed in claim 7 wherein said attenuator comprises a frustoconical-shaped sleeve member and a polygonal-shaped plate member attached to said sleeve intermediate its end, said plate member being connected to said shaft and means defining a plurality of openings between said plate member and said sleeve so that batter flows downwardly along said sleeve and moves outwardly from the periphery thereof.